June 23, 1942.  R. J. MORAWETZ  2,287,745
MOTOR CONTROL SYSTEM
Filed Sept. 29, 1939  2 Sheets—Sheet 1
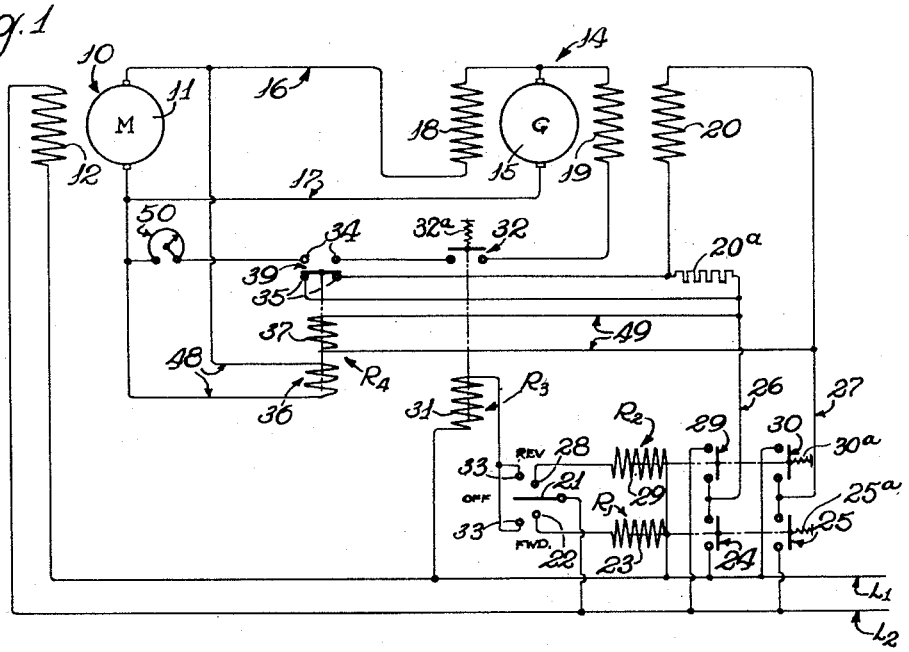
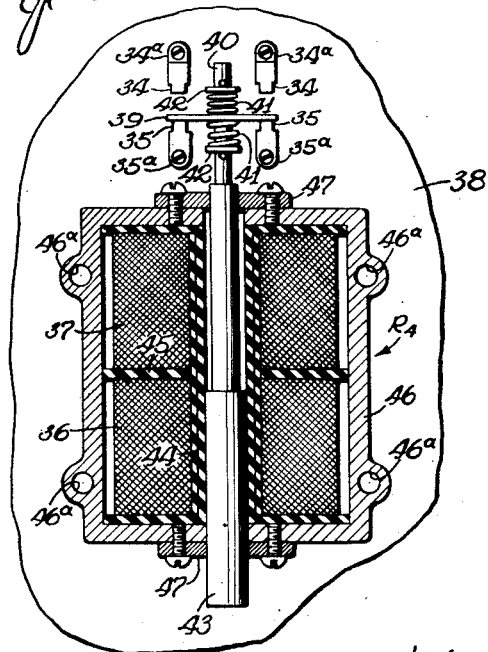
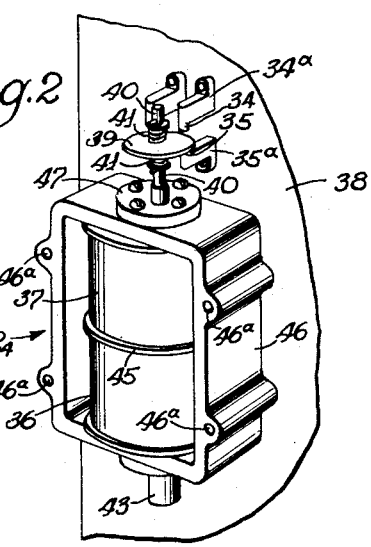
INVENTOR
Richard J. Morawetz
by Parker, Carton, Pitzner & Hubbard
ATTORNEYS June 23, 1942.     R. J. MORAWETZ     2,287,745

MOTOR CONTROL SYSTEM

Filed Sept. 29, 1939     2 Sheets-Sheet 2

INVENTOR
Richard J. Morawetz
by Parker, Carlson, Pitner & Hubbard
ATTORNEYS

Patented June 23, 1942

2,287,745

UNITED STATES PATENT OFFICE 2,287,745

MOTOR CONTROL SYSTEM

Richard J. Morawetz, Elm Grove, Wis.

Application September 29, 1939, Serial No. 297,085

4 Claims. (Cl. 172—239)

The invention relates to improvements in control systems for electric motors and particularly for reversible motors.

The general aim of the invention is to provide a control system for a reversible motor by means of which rapid, though safe, acceleration and deceleration of the motor may be accomplished not only during stopping and starting, but also during plugging.

A further object is to provide a new and improved motor control system by means of which the control circuit conditions for the motor are automatically changed during initial acceleration in response to motor speed and again automatically changed upon stopping or plugging, but which are not affected by motor speed changes after the initial acceleration even though the motor speed should, for any reason, fall below the critical speed at which the changed conditions were automatically effected during the initial acceleration.

Another object is to provide a control apparatus, particularly adapted for use with a Ward Leonard system, by virtue of which acceleration and deceleration of the motor are effectually and accurately controlled during starting, stopping and plugging.

Still another object is to provide a control system of the character indicated which is simple in operation, easy to manipulate, and is economical to construct in view of the minimum number and simplicity of the parts required.

Further objects and advantages of the invention will become apparent as the following description proceeds, taken in connection with the accompanying drawings in which:

Figure 1 is a wiring diagram of a motor control system embodying the invention.

Fig. 2 is a perspective view of a compound relay included in the system.

Fig. 3 is an enlarged sectional view of the relay of Fig. 2.

Figure 4:
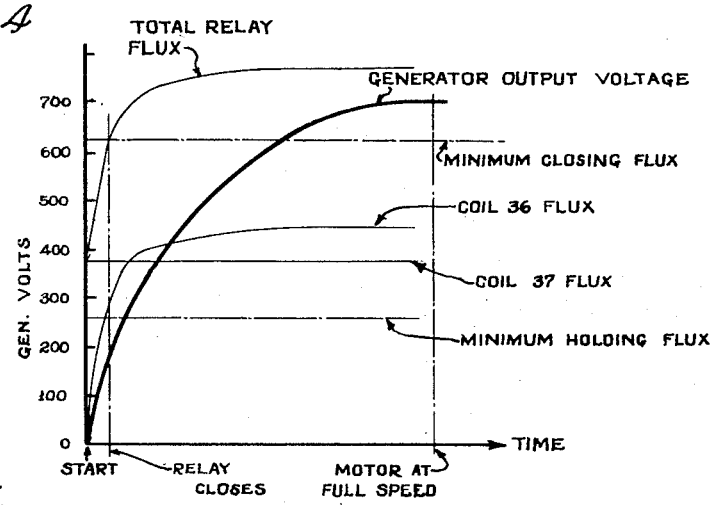
Fig. 4 is a set of characteristic curves for the apparatus during starting.

Although a particular embodiment and application of the invention have been shown and described in some detail there is no intention to thereby limit the invention to such embodiment and application, but, on the other hand, the appended claims are intended to cover all modifications and alternative constructions falling within the spirit and scope of the invention.

For purposes of exemplification, the invention has been disclosed herein as applied to what is commonly known as a Ward Leonard system. Such systems are, as a general type, well understood in the art and, consequently, only a brief discussion of their characteristics is necessary for an understanding of the application of the present invention to them. In brief, such a Ward Leonard system includes a motor which is started, stopped, reversed and varied in speed by controlling the operation of a generator permanently connected to it in order to effect the necessary changes in magnitude and polarity of input voltage to the motor to accomplish the motor operation desired. Such control of the generator output voltage is accomplished by corresponding changes in the generator field excitation, either directly or through the control of the field of an exciter generator which supplies the field of the main generator.

In the present instance a simple form of Ward Leonard system has been embodied in the control network of Fig. 1. It includes a direct current motor 10 having an armature 11 and a separately excited field 12. This motor is supplied with current from, and controlled through the medium of, an associated generator 14 having an armature 15 connected to that of the motor through conductors 16 and 17, and driven by a suitable prime mover (not shown).

In the instant apparatus (Fig. 1) the generator 14 is provided with a series field 18 differentially connected in the conductor 16, a shunt field 19 and a separately excited field 20. The separately excited fields 12 and 20 of both the motor and the generator are supplied from some suitable source (not shown) of excitation potential connected to the supply lines $L_1$ and $L_2$. These supply lines are permanently connected to the motor field.

The motor 10 is started, stopped and plugged by corresponding changes in the generator output voltage applied to it through the conductors 16 and 17. In turn, this generator output voltage is controlled, for the purpose noted, by control of excitation of its separately excited field 20 supplemented by control of its shunt field 19. For such control of the separately excited field 20 a reversing switch mechanism is provided.

The reversing switch mechanism may be of any suitable form of which a number are available in the art. In the present instance a selector switch 21 is provided which is shiftable from a central "off" position alternatively to either a "forward" or "reverse" position. In its "forward" position a contact 22 is closed, thereby energizing the actuating winding 23 of a main reversing contactor R1. Energization of this winding 23 causes the contactor to close its contacts 24 and 25 (normally biased to an open position by a spring 25a) to connect the leads 26 and 27 of the separately excited generator field 20 respectively, to the supply line L1 and L2. Similarly, when the selector 21 is in its "reverse" position it closes a contact 28 to energize the actuating winding 29 of an alternative main reversing contactor R2. Thereupon this latter contactor closes its contacts 29 and 30 (normally biased to open position by a spring 30a) to connect the field leads 26 and 27 in a reverse sense to the supply lines L2 and L1 so that the field 20 is excited with a potential of polarity opposite to that when the contactor R1 is closed. When the selector 21 is in its "off" position both of the contactors R1 and R2 are, of course, deenergized and the generator field open-circuited.

To prevent the generator 14 from inadvertently continuing in operation on its shunt field 19 when the separately excited field 20 is open-circuited by the reversing switch mechanism provision is made in this latter mechanism for simultaneously open-circuiting the shunt field when the selector switch 21 is turned to its "off" position. For this purpose a relay R3 is provided having an actuating winding 31 and a pair of normally open contacts 32 connected in series with the shunt field 19. When the selector switch 21 is shifted to either its "forward" or "reverse" positions it also closes one or the other of the contacts 33, thereby energizing the relay winding 31 to close the contacts 32 in the shunt field circuit. As soon, however, as the selector 21 is returned to its "off" position this relay R3 drops out permitting a spring 32a to open the contacts 32 which open-circuits the shunt field 19.

In accordance with the one aspect of the present invention, a control network is correlated with the apparatus heretofore described in such manner that rapid and safe acceleration and deceleration of the motor 10 are accomplished during starting, stopping and plugging. In the illustrative construction (Fig. 1) the control system is such that when the motor 10 is idle, a first switch or set of contacts 34 in the generator shunt field circuit is open to disable this field and a second switch or set of contacts 35 is closed to shunt out a resistor 20a connected in series with the separately excited generator field 20. Accordingly, when one or the other of the main reversing contactors R1, R2 is closed to start the generator and motor the generator will be started with full voltage on its separately excited field 20 and with its shunt field 19 open so that its output voltage builds up for rapid but safe acceleration of the motor 10. By means described below, the switch 34 is automatically closed and the switch 35 opened when the motor 10 has accelerated to a predetermined speed so that the full shunt field excitation is thereby cut in on the generator and the excitation of the field 20 substantially diminished by removing the shunt from about the series connected resistor 20a, whereupon the motor continues to accelerate rapidly. The arrangement is such, however, that should the motor speed again decrease even to standstill under, for example, a heavy load or for any other reason the switches 34 and 35 will not be affected so long as the selector 21 is not shifted. In this way the normal running setting of the switches is retained on the motor 10 despite the fact that its speed has decreased below the critical value at which the generator field excitation was changed during the initial motor acceleration. Upon shifting the selector 21 to its "off" position it open-circuits both the shunt and separately excited fields 19 and 20, as heretofore described, so that the generator output voltage rapidly falls to zero and at the same time the switches 34 and 35 are automatically restored to their initial positions preparatory to a subsequent restarting of the motor. Upon plugging, that is, shifting of the selector 21 through its "off" position to its opposite direction position the switches 34 and 35 are again restored immediately to their initial positions and operate to control the generator fields during acceleration of the motor in the opposite direction in the manner heretofore noted.

To actuate the switches 34 and 35 in the manner described they are incorporated as sets of contacts in a compound relay R4 having actuating windings 36 and 37. In the particular form of relay shown (Figs. 2 and 3) the structure includes the pairs of lower and upper contacts 34 and 35 which are mounted on suitable supporting brackets 34a and 35a projecting from a vertical panel 38. Between these pairs of stationary contacts is a bridging member 39 in the form of an electrically conductive disc. A pin 40 extends vertically through a central aperture in the disc 39 and the disc is yieldably supported on the pin by means of a pair of helical compression springs 41 which encircle the pin. The opposed inner ends of these springs bear against the disc 39 and their outer ends bear against stop collars 42 fixed on the pin. The lower end of the pin 40 is threaded in the upper end of a generally cylindrical armature 43, which projects downwardly through registering central apertures in the windings 36, 37. These windings are coiled on a suitable insulating spool structure including a central sleeve 44, in which the armature 43 is slidable, and a partition disc 45 between the two windings.

To complete the magnetic circuits for the compound relay windings, in cooperation with the armature 43, a magnetic casing 46 of generally rectangular form is provided extending across the outer sides and ends of the windings. A suitable non-magnetic cover (not shown) is fixed to the casing 46 by screws threaded in the holes 46a. The vertically movable armature 43 is biased downwardly by gravity, and when the windings 36, 37 are deenergized, occupies substantially the position shown in Fig. 3. The upper and lower portions of the armature are slidable in registering holes fashioned in discs 47 screwed to the casing ends. It will be noted that the upper portion of the armature 43 is reduced in cross section so as to interpose an air gap in the magnetic circuit for the flux from the upper winding 37 which threads the armature. By this means, and by proper proportioning of the windings and iron in the circuit, the magnetic circuit for the upper winding 37 remains substantially unsaturated during the operation of the device while, as will appear in greater detail below, the magnetic circuit for the lower winding 36 becomes saturated when full normal voltage is applied to it.

In general, the first winding 36 of the compound relay R4 is energized in accordance with variations in speed of the motor 10 and the second winding 37 is energized in accordance with changes in the setting of the reversing switch mechanism. In other words, a potential is applied to the winding 36 which varies substantially directly in accordance with the changes in motor speed while a second potential is applied to the other winding 37 which, though substantially constant in magnitude, is cut on and off and changed in polarity in accordance with the setting of the reversing switch mechanism. To this end, the winding 36 is connected through leads 48 with the terminals of the motor armature 11 (Fig. 1) so that the potential applied to this winding is the same as that supplied to the motor. Since the motor speed is substantially directly proportional to its input voltage, the energization of the winding 36 will also be substantially proportional to the motor speed. The second relay winding 37 is, on the other hand, connected to the leads 26 and 27 of the generator separately excited field 20, through conductors 49 and at a point inside the reversing contactors R1 and R2. Consequently, the voltage on the winding 37 is cut on and off and reversed in polarity by the reversing contactors in unison with the corresponding changes in potential applied to the separately excited generator field 20.

The resistance and number of turns in the two relay windings 36 and 37 are so related to the magnetic structure of the relay that the armature 43 can only be picked up when both windings are energized, although the armature can be held in by the winding 37 alone. Furthermore, the arrangement is such that the armature will drop upon a reversal in the potential applied to either of the relay windings. The purpose of this relation will presently appear.

It will be appreciated that the potential applied to the winding 36 may be substantially higher than that applied to the other winding 37 but the resistance and number of turns in the two windings are so related that the flux produced by the winding 37 is only slightly less than that produced by the winding 36 when full voltage is applied to the motor 10. Thus, upon reference to Fig. 4 it will be seen that a substantially constant flux is produced by the winding 37, which is excited from the constant potential on the supply lines L1 and L2. As was previously noted, however, the magnetic circuit for the other winding 36 is saturated when full motor input voltage is applied to it so that the flux produced by this winding (also Fig. 4) is only slightly greater in magnitude than that for the winding 37 when the motor 10 is operating at full speed.

In the operation of the control system described, the operator moves the selector 21 from its "off" position to its "forward" position to start the motor 10 in a forward direction (Fig. 1). This setting of the selector switch energizes the reversing contactor R1 thereby connecting the separately excited generator field 20 to the supply lines L1, L2 and also closing the relay R3 in the shunt field circuit. At the same time potential is applied to the winding 37 of the compound relay R4. At the instant of starting, however, the output voltage of the generator is zero so that there is no voltage on the other relay winding 36. Hence the net flux acting on the relay armature 43 is simply that due to the winding 37. Since this is less than minimum required to pull in the compound relay (Fig. 4) the relay R4 does not pick up. Consequently, the contacts 35 are retained closed, shunting out the resistance 20ᵃ so that full voltage is applied to the separately excited field 20 and the contacts 34 are retained open in the shunt field circuit.

The generator output voltage builds up rapidly with consequent rapid acceleration of the motor. This rapidly increasing generator output voltage correspondingly increases the flux produced by the relay winding 36 (Fig. 4) so that the net flux in the relay soon reaches the minimum pull-in value and picks up the relay armature. Thereupon the contacts 35 open to remove the shunt from about the resistance 20ᵃ so that the voltage on the separately excited field 20 is diminished and at the same time the contacts 34 are closed to cut in the shunt field 19. Thereafter the generator output voltage continues to build up until it reaches full value at which the motor runs at full speed. The motor speed can thereafter be varied at will by changing the generator shunt field excitation through the medium of an adjustable rheostat 50 (Fig. 1).

In the event that the speed of the motor 10 should be subsequently decrease, with a consequent decrease in the voltage of the current which it draws, due, for example, to change in the speed adjusting rheostat 50 or inadvertently due to the imposition of a heavy load on the motor, the flux produced by the relay winding 36 may fall even to zero without dropping out the compound relay R4. This is for the reason that the other relay winding 37 is retained energized with its constant excitation potential and this is sufficient to hold in the relay (Fig. 4) even though it is not sufficient alone to pick up the relay initially. In general, then, the system continues to operate with full power supplied to the motor 10 despite any subsequent variations in the voltage of the current which it draws so that the compound relay R4 does not interfere with the normal operation of the motor.

To stop the motor 10 the operator shifts the selector switch 21 to its "off" position. This drops out the one of the main contactors R1 or R2 which was previously closed and at the same time opens the relay R3. Thereby, both the shunt field 19 and separately excited field 20 of the generator are open-circuited so that the generator output voltage quickly diminishes to zero and the motor 10 decelerates rapidly to a standstill. Since the potential has been cut off for both of the windings 36 and 37 of the compound relay R4 it drops out, returning its contacts to their initial positions, preparatory to a restarting of the motor in the manner previously described.

Figure 5:
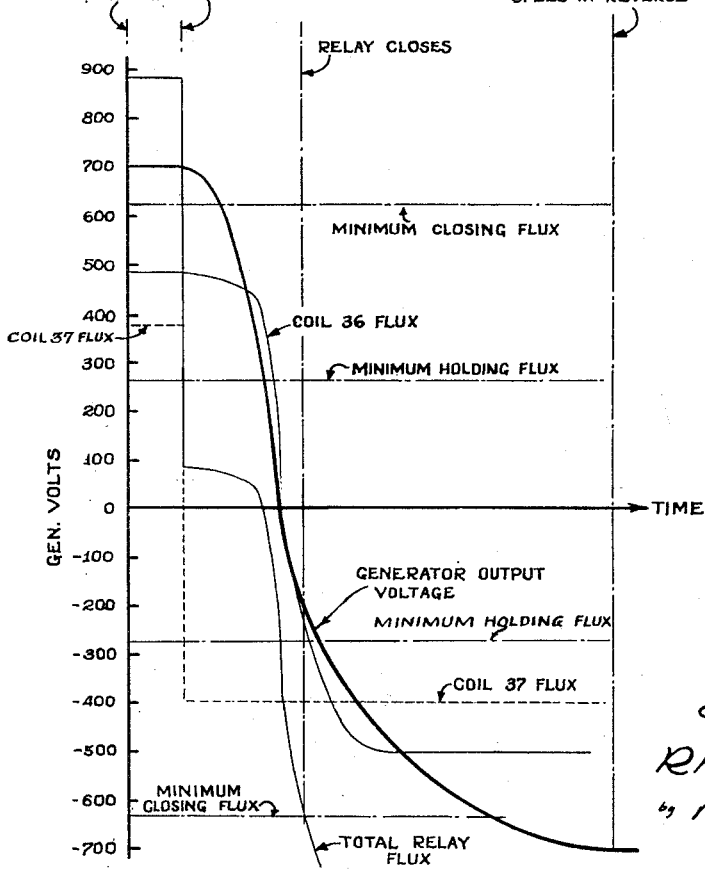
Fig. 5 is a set of characteristic curves of the apparatus during stopping and plugging.

To plug the motor 10 the operator, of course, shifts the selector switch 21 from its "forward" to its "reverse" position or vice versa. If, for example, the motor is operating in a forward direction and the selector switch 21 is shifted to its "reverse" position the main contactor R1 is dropped out and the other main contactor R2 picked up, thereby reversing the polarity of the voltage applied not only to the generator's separately excited field 20, but also to the compound relay winding 37. During this throw over of the selector switch 21 the relay R3 may be momentarily dropped out, but picks up again immediately so its action may be disregarded in this instance. The reversal in potential on the compound relay winding 37 drops the net flux acting on the armature of this relay to a value well below the minimum for hold-in (Fig. 5) so that the compound relay drops out, opening its contacts 34 and closing its contacts 35. Accordingly, the shunt field 19 is open-circuited and the now reversed potential on the separately excited field 20 is substantially increased by the shunting out of the resistor 20ᵃ. Therefore, the generator output voltage (Fig. 5) diminishes quickly to a zero value and begins to build up in the opposite sense. Correspondingly, the motor decelerates to zero speed and then accelerates rapidly in the opposite direction. As this latter action takes place the potential on the compound relay winding 36 is increased, now in the same sense as that on the other winding 37, until the net flux exceeds the minimum value for pull-in, at which time the relay R₄ picks up again. As before, the contacts 35 open to diminish the potential on the separately excited field 20 and the switch 34 closes to cut in the shunt field 19 so that the generator voltage continues to build up, with a corresponding increase in motor speed, until the motor is again operating at full speed in the opposite direction.

From the foregoing, it will be seen that a simple and inexpensive control system has been provided by means of which motor acceleration and deceleration can be accurately and effectually controlled during starting, stopping and plugging. Furthermore, there is no interference with the motor supply voltage even though during operation the motor speed should, for one reason or another, drop below the critical value at which the generator field controlling mechanism is operated during the initial acceleration of the motor.

I claim as my invention:

1. In a control apparatus for a Ward Leonard system including a motor supplied from means comprising a generator having a separately excited field and a shunt field, the combination of a reversing switch mechanism for controlling the application of voltage to said separately excited generator field to start and stop the generator and reverse the output voltage thereof, a normally open first switch interposed in the generator shunt field circuit, a resistance in series with the generator separately excited field and a normally closed second switch in shunt with said resistance, and means responsive jointly to changes in motor speed and the setting of said switch mechanism for closing said first switch and opening said second switch in response to acceleration of the motor from rest to a speed exceeding a predetermined value and thereafter maintaining said switches in such condition irrespective of subsequent changes in motor speed so long as said reversing switch mechanism is not again actuated and for opening said first switch and closing said second switch in response to a subsequent change in the setting of said reversing switch mechanism.

2. In a control apparatus for a Ward Leonard system including a motor supplied from means comprising a generator having a separately excited field and a shunt field, the combination of a reversing switch mechanism movable from an off position alternatively to a forward or reverse position for open circuiting both the shunt and separately excited generator fields in its off position and applying voltage to said separately excited field in reverse senses in its forward and reverse positions to reverse correspondingly the generator output voltage, a normally open first switch interposed in the generator shunt field circuit, a resistance in series with the generator separately excited field and a normally closed second switch in shunt with said resistance, and means responsive jointly to changes in motor speed and the setting of said reversing switch mechanism for closing said first switch and opening said second switch in response to acceleration of the motor from rest to a speed exceeding a predetermined value and thereafter maintaining said switches in such condition irrespective of subsequent changes in motor speed so long as said reversing switch mechanism is not again actuated and for opening said first switch and closing said second switch in response to a subsequent change in the setting of said reversing switch mechanism.

3. In a control apparatus for a Ward Leonard system including a motor supplied from means comprising a generator having separately excited and shunt fields, the combination of a reversing switch mechanism for controlling the application of voltage to said separately excited field to start and stop said generator and reverse the output voltage thereof, a normally open first switch interposed in the generator shunt field circuit, means including a normally closed second switch operable when said switch is open to diminish the potential applied to the separately excited field, electromagnetic operating means for said first and second switches including first and second actuating windings operable upon energization of both of said windings by potentials exceeding predetermined values to close said first switch and to open said second switch and for reopening said first switch and reclosing said second switch upon a reversal of the potential applied to said first winding, means for supplying an energizing potential to said first winding in accordance with the setting of said reversing switch mechanism, and means for supplying an energizing potential to said second winding directly proportional to the potential supplied to the motor.

4. In a control apparatus for a Ward Leonard system including a motor operated from means comprising a generator having a separately excited field and a shunt field, the combination of a reversing switch mechanism for controlling the application of voltage to said separately excited generator field to start and stop the generator and reverse the output voltage thereof, means including a normally closed first switch operable when said switch is open to diminish the potential applied to the separately excited field, means including a second switch associated with the generator shunt field circuit and operable when said switch is open to reduce the potential applied to the generator shunt field, and means responsive jointly to changes in motor speed and the setting of said reversing switch mechanism for closing said second switch and opening said first switch in response to acceleration of the motor from rest to a speed exceeding a predetermined value and thereafter maintaining said switches in such condition irrespective of subsequent changes in motor speed so long as said reversing switch mechanism is not again actuated and for opening said second switch and closing said first switch in response to a subsequent change in the setting of said reversing switch mechanism.

RICHARD J. MORAWETZ.